United States Patent
Park et al.

[11] 4,024,854
[45] May 24, 1977

[54] DRUM UNLOADING APPARATUS AND METHOD

[75] Inventors: George C. Park, Bristol, N.H.; Arthur B. Porter, Andover, Mass.

[73] Assignee: Bolton-Emerson, Inc., Lawrence, Mass.

[22] Filed: Dec. 31, 1975

[21] Appl. No.: 645,893

[52] U.S. Cl. .................. 126/343.5 A; 222/146 H; 100/93 P; 222/325
[51] Int. Cl.² .................................. B30B 15/34
[58] Field of Search ............ 425/406; 126/343.5 R, 126/343.5 A; 219/243; 100/93 P, 38; 222/146 R, 146 H, 146 HS, 146 HE, 325, 326, 386, 389

[56] References Cited
UNITED STATES PATENTS

| 2,130,455 | 9/1938 | Cain | 126/343.5 A |
| 2,472,594 | 6/1949 | Kuehn et al. | 126/343.5 A |
| 2,773,496 | 12/1956 | Czatnecki | 222/146 HE |
| 3,281,020 | 10/1966 | Steiner | 222/326 |

Primary Examiner—Robert B. Reeves
Assistant Examiner—H. Grant Skaggs
Attorney, Agent, or Firm—Pearson & Pearson

[57] ABSTRACT

For supplying high viscosity coating material in liquid form to a coating machine from drums of solid material, the opposite ends, or heads of each drum are removed and the drums are successively inserted between a vertically, upstanding heated, stationary, lower mandrel, and a vertically, downwardly movable upper platen of a press. As the upper platen presses the open ended drum down the heated lower platen liquifies the coating to pass therethrough to a holding tank. The lower platen, or heat exchanger includes a tapered, truncated conical, sharp edged outer area, radial fins and a central, conical inner area for contacting the material.

14 Claims, 6 Drawing Figures

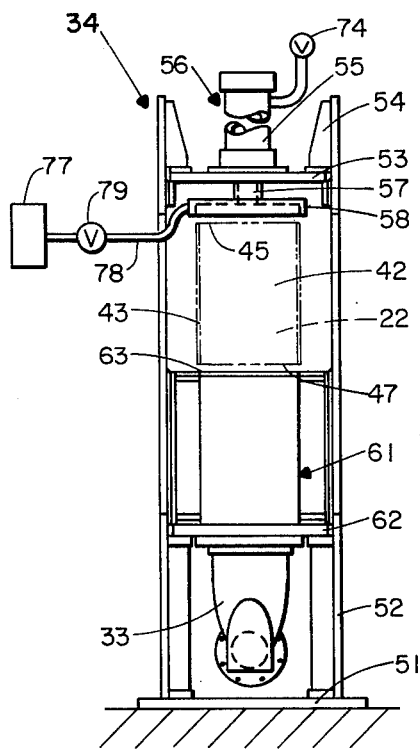
Fig. 2.
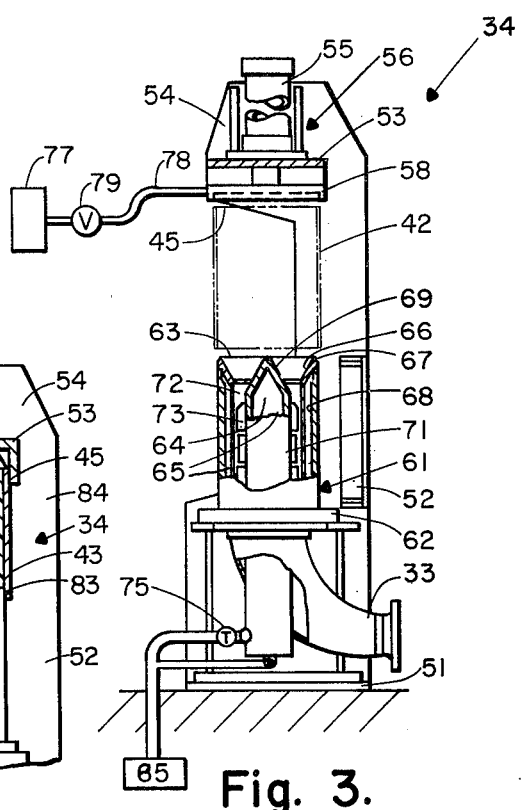
Fig. 6.
Fig. 3.
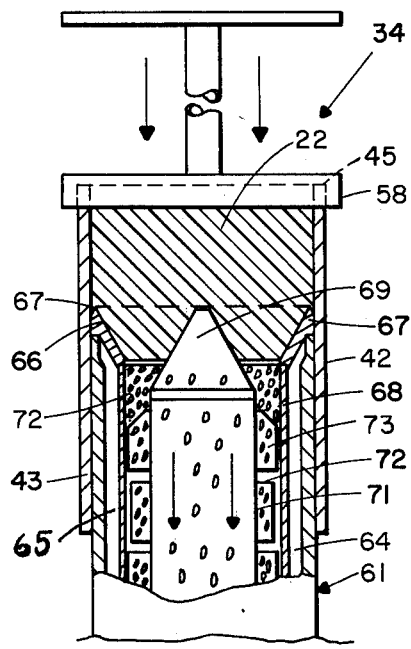
Fig. 4.
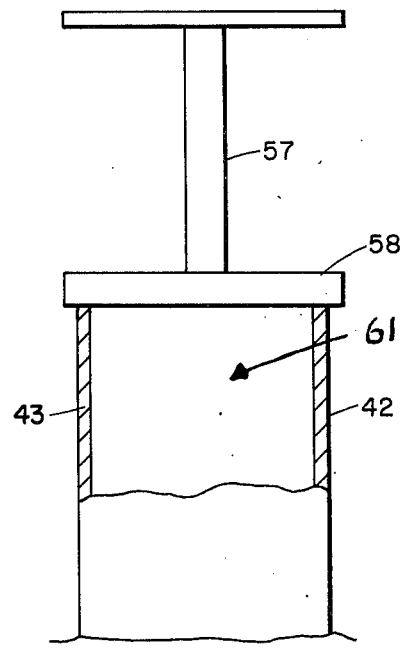
Fig. 5.

DRUM UNLOADING APPARATUS AND METHOD

BACKGROUND OF THE INVENTION

Pressure sensitive adhesives, and other high viscosity coating materials are typically received by the coating plant in the form of solid, tacky rubber-like blocks. A covering paper must be removed from these blocks and the blocks are then cut into smaller pieces manually by means of a hot knife. The smaller blocks are then put into a melt tank, usually consisting of a steam or oil jacketed, agitated vessel, in which the temperature of the material is raised to the melt point or above, and the material is converted into a high viscosity liquid. This high viscosity liquid is then pumped into a heated, agitated holding tank and from there to the coating machine.

The object of this invention is to reduce degradation of the material from prolonged heating, mechanical shearing and exposure to oxygen, while providing means for preparing packaged material for the usage vessel without handling labor and at a high rate.

PRIOR ART

In hand operated, portable, pistol grip type devices for intermittently dispensing thermoplastic material, in the manufacture of shoes, it has heretofore been proposed to provide a chamber for solid adhesive, with a heating unit to liquify the portion of the adhesive to be delivered into the gun tip. Exemplary of such apparatus is that disclosed in U.S. Pat. No. 3,587,930 to Shultz of June 28, 1971, and in the patents cited thereagainst, namely U.S. Pat. Nos. 2,518,748, 3,228,566 and 3,285,475.

In the devices of these patents there is a stationary hollow cylindrical cylinder, or well, in which a ram, or piston head is vertically movable to press a cylindrical charge of solid coating downwardly in the well and the heating unit is at the level of the bottom of the well to liquify the mass.

In non-portable devices for liquifying barrels, or drums, of solid coating material, which is the object of this invention, it has heretofore been proposed to place each drum in upstanding, open top position on a platen, so that the drum serves as a cylinder and to progressively lower a ram, or piston, head from top to bottom within the drum as in U.S. Pat. No. 3,637,111 to McCreary of Jan. 25, 1972, or to progressively raise the drum against a stationary ram as in U.S. Pat. No. 3,031,166 to Hooker of Apr. 24, 1962. In both of these patents the upper ram, piston head or platen is the heating unit, engaging the upper, exposed face of the material in the drum to liquify it and the liquid material is drawn off by pump suction from the top of the drum in an upward direction.

SUMMARY OF THIS INVENTION

Unlike the above devices, in this invention the drum is open at both ends, and while the open ended drum serves as the cylinder, it is the upper platen of the press which moves vertically downward and the platen engages the top rim of the drum as well as the top surface of the material in the drum. Also unlike the above devices the lower ram, or piston head is stationary and the open ended drum is sleeved down around it while the heated stationary lower ram melts the solid material allowing it to pass down through the ram by pressure and by gravity, thereby requiring no pump.

In the method of this invention the supplier of the coating material, which may be pressure sensitive adhesive or the like, ships the material in solid form in drums of heavy wall fibre, or equivalent material and of specified length and diameter. The opposite end covers are both removed at the coating plant and the cylindrical drums minus the covers are successively inserted in the drum unloader of the invention. As the upper edge of the drum is pressed downwardly, the drum sleeves around the ram while the ram melts and drains away the liquified material progressively from the lower surface.

The liquid coating material may be discharged to a holding tank, which is suitably heated by means of a jacket with hot steam, hot oil, or the like and which also contains a suitable rotor for continual agitation of the liquid. From the holding tank the liquid passes by gravity or pump directly to the coating machine. Preferably the holding tank is hermetically sealed and blanketed by an inert gas to exclude air from the process. Exposure to air tends to deteriorate the material. A heated static mixer may be installed between the drum unloader and the holding tank to further reduce the viscosity and to improve the homogeneity of the mix. The discharge of the drum unloader may by-pass the holding tank, and thus lead directly into the suction side of the coating machine pump supplying the coating material if desired.

The drum unloader of the invention includes a specially designed cylindrical heat exchanger which has a cylindrical outer section with an outside diameter slightly smaller than the inside diameter of the conventional, or special drum, to be used in the system. The upper periphery of the outer section is tapered downwardly and inwardly from the outer rim and the upper portion of the inner section is tapered and conical, with both sections heated by steam, or other means, to penetrate and melt the solid mass. Metal vanes or fins extend radially between the sections to distribute heat.

When the drum bottoms out the movable upper platen, or actuator and the empty drum is retracted upwardly so that the empty drum may be replaced by a full, open ended, container.

Compressed air is used to lower any excess melt level before drum retraction and to purge the system between grade changes

BRIEF DESCRIPTION OF THE DRAWINGS

FIG. 2 is an enlarged, front, elevational view of the drum unloader of the invention;

FIG. 3 is a side elevational view of the device shown in FIG. 2 with parts broken away;

FIG. 4 is a fragmentary view similar to FIG. 3 showing a drum half unloaded;

FIG. 5 is a view similar to FIG. 3 showing the drum fully unloaded and the platen ready for retraction, and FIG. 6 is a view similar to FIGS. 2 and 3 of a drum unloader actuated by gas pressure only.

DESCRIPTION OF A PREFERRED EMBODIMENT

Figure 1:
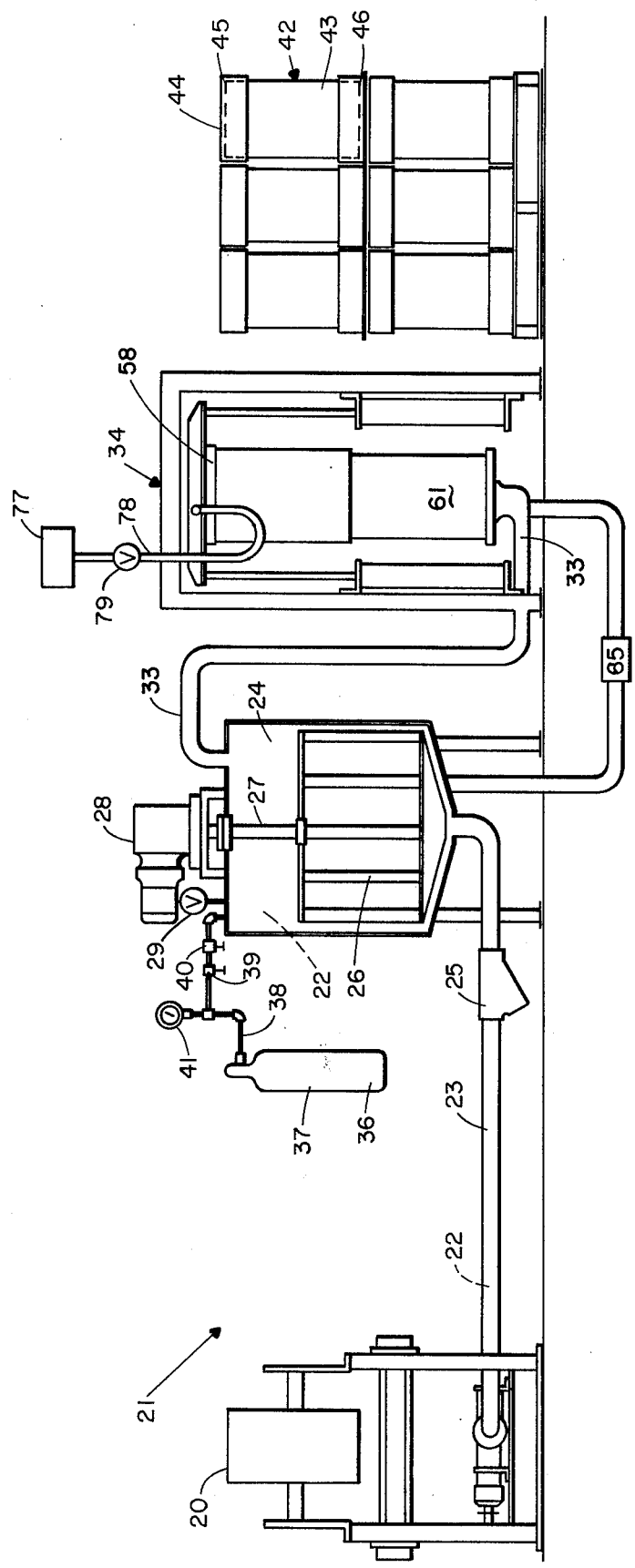
FIG. 1 is a schematic, front elevational view of a coating line with the drum unloader of the invention installed therein.

In FIG. 1 a typical coating machine 20 is shown in a plant 21 the machine 20 being arranged to apply a coating of high viscosity material 22 such as a pressure sensitive adhesive. The liquid adhesive coating 22 is delivered to machine 20 by conduit 23 from a holding tank 24, there being a suitable dump valve at 25. Tank 24 is preferably hermetically sealed and contains an agitator rotor 26, revolved by the shaft 27 and electric motor 28, there being a pressure relief valve at 29.

Liquid adhesive 22 travels by way of conduit 33 of the drum unloader 34 into tank 24.

Preferably a tank 36 of an inert gas 37, such as nitrogen, is connected by pipe 38, with reducing valve 39, flow control valve 40 and pressure gauge 41, to the upper part of tank 24 to blanket the adhesive 22 in the tank and protect it from exposure to the ambient atmosphere.

Stacked next to the drum unloader 34 are a plurality of conventional shipping containers 42, each of predetermined inside diameter and axial length, and each having a hollow cylindrical wall 43, an upper end cover 44, an upper peripheral rim 45 and a lower end cover 46, the drums 42 usually being made of fiberboard. Thus the vertical wall 43 of each container 42 is of predetermined cross sectional area, predetermined diameter if a cylinder, and predetermined length to fit in drum unloader 34.

The coating material 22 in each drum 42 is solid and the first step in the method of the invention is to remove at least the lower end cover 46 to expose the solid lower face 47 of the material 22 and preferably the upper cover 44 is removed also to expose the solid upper face 48 of the material 22.

The drum unloader 34 as best shown in FIGS. 2–5, includes a base 51, having an upstanding frame 52 with an integral upper plate 53, suitably affixed by frame pieces 54, the plate 53 supporting the cylinder 55 of a fluid operated actuator 56. Actuator 56 drives a piston 57 downwardly under pressure, which can be mill air pressure, or hydraulic fluid pressure as from a pump and motor, not shown, thereby driving the upper, vertically, movable member, or platen, 58, downwardly.

The heat exchanger 61, unlike prior art devices, is fixed and located at the lower part of the press, or unloader, 34, being affixed to a plate 62 integral with frame 52. The lower, stationary heat exchange member 61 is vertical and of elongated cylindrical configuration with an outside wall surface 49 of a diameter slightly smaller than the diameter of the inside wall surface 50 of drum wall 43. Thus the wall 43 of each successive drum 42 may be guided on, supported by and sleeved downward vertically around the elongated outer wall surface 50 of the fixed, heated piston head 61 by the pressure of moveable platen 58 in direct contact with the upper rim 45 of each drum. As shown the heat exchanger 61 includes an upper surface area 63 which contacts the exposed, solid lower face 47 of the material 22 in each drum, the area 63 being heated to above the melting point of the solid material 22 by steam, or hot oil, 64, in the jackets 65 to progressively liquify the material from the bottom up to drain into conduit 33. The heating means 85 may be electric resistance heaters, gas flame or the like.

The holding tank 24 may also be connected to heating means 85 to further reduce the viscosity and increase the homogeneity of the liquified material 22.

The surface 63 includes an outer annular, truncated conical portion 66 extending from the outer peripheral, rather sharp edge or rim, 67, downwardly and inwardly to inner wall 68 and includes a pointed, conical, central portion 69, leading downwardly on an incline to a wall 71, spaced from wall 68 to form an annular, drain channel, or cavity, 72, terminating in conduit 33. Walls 68 and 71 are spaced apart at 72 with radial vanes, or fins 73 extending across the space to increase the heat distribution.

The pressure applied on the drum top 45 may be merely gravity, but in any case it is preferably constant as by means of the pressure control valve 74. Similarly the heat applied by heating means 85 is preferably constant by means of thermostat 75. Thus the solid material is converted to liquid at a controlled rate as it drains through the heat exchanger 61.

In FIG. 4 the drum unloader 34, is shown in operation, with a drum 42 placed over heat exchanger 61 in the press 34 and the platen, or ram, 58 brought down on the rim 45, or top, of the drum to force it down and sleeve it onto the exchanger. The sharp peripheral edge 67 and the point of cone 69 have penetrated the solid material, and melted it as force is maintained on the drum rim and as the material melts from the bottom up. In FIG. 5, the drum is shown bottomed out and empty, whereupon the actuator is reversed, retracting the empty drum for removal and replacement with a full drum.

Preferably a compressed air source 77 is provided, connected to the platen 58 by conduit 78, and controlled by valve means 79. Thus if the melt proves so fluid that it runs down the delivery conduit 33 (FIG. 1) and overflows the heated ram cavity 72, compressed air may be introduced to suitably depress the melt level which can than be maintained depressed by a check or automatically controlled valve before the empty drum is retracted. This air also purges the system between grade changes.

As shown in FIG. 6, the pressure exerted to unload each drum 42 can be provided without a press platen 58, and solely by compressed air, or gas, from a source 77 and conduit 78, acting directly on the solid upper face, or top surface 48, of the material 22 in the drum 42. Thus gas can be either total, or a subsidiary source of pressure for unloading.

If gas pressure is the total pressure source a pressure seal 81 is effected around the upper drum periphery 45 and a similar seal 82 is effected around the lower drum periphery 83. Heating from any convenient source 84, or 85 (FIG. 1), is applied to the exterior of wall 43 of drum 42, or the inside surface of the drum is given suitable release properties and with the drum 42 held stationary against the top of the heat exchanger 61, the gas pressure from source 77 propels the material 22 down through the heat exchanger.

If the gas pressure is subsidiary it may be used after the melt cycle with the drum bottomed, to lower melt level sufficiently to eliminate overflow from fluid head difference, in conjunction with a check, or automatically controlled valve. It may also be used to purge the drum unloader and its outlet piping as for grade changes.

We claim:

1. A method for unloading a cylindrical shipping container of solid high viscosity material by means of a press having a lower stationary member with an elongated, vertical cylindrical outer wall and an upper, vertically moveable, member, said method comprising the steps of:

opening at least the lower end of said container and inserting said container in said press with the solid, high viscosity material, in the open lower end, resting on the upper face of the lower, stationary member of said press and with the upper end of said container under the upper vertically moveable member of said press;

pressing said upper member progressively downwardly on the upper end of said container, to sleeve the vertical wall of said container downwardly around the said elongated vertical cylindrical outer wall of said lower stationary member to guide and support the same while simultaneously maintaining said lower member at a temperature above the melting point of said high-viscosity material to melt the material in the open lower end of said container and liquify the same and draining said liquified material down through said elongated heated lower member for delivery away therefrom.

2. A method as specified in claim 1 plus:

the step of conducting said liquified material into a hermetically sealed holding tank and blanketing said material in said tank with an inert gas to exclude air therefrom.

3. A method as specified in claim 2 plus the step of:

subjecting said material to heating means in said tank to reduce the viscosity and increase the homogeneity of the material.

4. A method as specified in claim 1 wherein said heating and liquifying steps include the step of applying heat to the central area of the bottom of said material while simultaneously applying heat by a sharp edge to an annular narrow area of said bottom extending around the outer periphery, 5. A method as specified in claim 1 wherein said step of pressing down on the open top of said container is accomplished in a predetermined program of application of pressure per square inch.

6. A method for unloading a cylindrical shipping drum of solid high viscosity material, said drum being of predetermined cross-sectional area, which comprises the steps of removing at least one end cover of said cylindrical drum and mounting said drum in vertical upstanding position, with the solid material in its open lower end supported on the upper face of a hollow vertically upstanding cylindrical heat exchanger of slightly less diameter than the diameter of said drum; and heating said exchanger to a temperature above the melting point of said material and applying vertical downward pressure on the opposite upper end of said drum while slideably guiding and supporting said drum only on the elongated outer cylindrical surface of said vertical heat exchanger to drain and force the melted liquid material of said drum down through said heat exchanger as said material melts from bottom to top and until the said drum bottoms out.

7. In apparatus for unloading container of solid high viscosity coating material, said container being an elongated cylinder with a predetermined cross sectional area, the combination of:

a press having an upper, moveable platen member, a fixed lower, heat exchange member, said lower member being an elongated cylinder of slightly less cross-sectional area than that of said container to slideably fit therewithin, and power mechanism for moving one said member toward the other;

said elongated cylindrical lower member having an upper surface area adapted to contact the lower face of the material in said container to melt the same, and having an elongated cylindrical outer surface for guiding said container.

heating means for heating said lower heat exchange member, on the outer cylindrical surface and upper surface area thereof, to a temperature above the melting point of said material;

and conduit means for collecting the melted, high-viscosity liquid as it drains down through said heat exchange member.

8. Apparatus as specified in claim 7 wherein:

said heat exchange member includes an upper surface area which comprises a truncated conical annular area tapering inwardly and downwardly from a sharp peripheral edge whereby said edge penetrates into the solid material in the open lower end of said container and melts said material to drain down said face toward the centre of said member.

9. Apparatus as specified in claim 7 wherein:

said upper surface of said heat exchange member includes an outer truncated-conical, annular portion terminating in an outer, upper sharp edge and a central conical portion with an annular space therebetween which forms a drainage conduit.

10. Apparatus as specified in claim 9 plus a plurality of spaced apart vanes extending across said space between said outer and inner portions, said vanes being heated by said heating means to accelerate melting by introducing heat to the center of the mass moving past said vanes and down said drainage conduit.

11. A method for unloading a cylindrical shipping drum of said high viscosity material, said drum being of predetermined cross-sectional area, which comprises the steps of:

removing the lower end cover of said cylindrical drum and mounting said drum in upstanding vertical position, with the exposed solid lower face of said material at said open lower end horizontal and supported on the upper face of a vertically upstanding hollow cylindrical heat exchanger of slightly less diameter than the diameter of said drum;

heating the upper face and elongated outer cylindrical face of said exchanger to a temperature above the melting point of said material, and applying downward pressure in a vertical direction to the upper end of said drum to guide, support and sleeve said drum on said vertically upstanding heat exchanger while forcing the melted liquid material of said drum down through said heat exchanger as it melts from bottom to top.

12. In apparatus for unloading an open ended cylindrical container of solid high viscosity coating material, said container having a predetermined cross-sectional area, the combination of:

a frame having an upper platen and a fixed lower, heat exchange member, said fixed lower-member being vertically upstanding and of slightly less cross sectional area than that of said container to slideably fit therewithin, the lower end of said container being supported on the upper face of said lower member and the upper end of said container being in sealed engagement with the lower face of said platen, a source of gas under pressure operably connected to said upper platen for exerting pressure directly on the upper face of said material in said container for sliding said material downwardly in said container;

said lower member having an upper surface area adapted to heat the lower face of the material in said container to melt the same;

heating means for heating said lower heat exchange member, and said upper surface area thereof, to a temperature above the melting point of said material;

and annular channel means extending downwardly within said lower heat exchange member for draining the melted high viscosity liquid away from said member.

13. Apparatus for progressively melting and dispensing a mass of solidified meltable material contained in a cylindrical shipping drum, said apparatus comprising;

an upstanding, fixed piston head of cylindrical configuration, having an elongated cylindrical outside wall of uniform diameter dimensioned to slideably fit within, support and guide the inside cylindrical wall of said drum for the full depth thereof;

heating means disposed longitudinally of the upper face of said piston head, said upper face being dimensioned to abut the exposed face of the meltable material in an open lower end of a said drum to progressively melt the same.

powered press means including a downwardly moveable upper platen, mounted at a spaced distance above said fixed piston head, and in direct pressure contact with the upper rim of an upstanding said drum for sleeving said drum down around said piston head, and channel means within said fixed piston head, for collecting liquid material, progressively melted by said upper face thereof, and delivering the same to a predetermined location.

14. Apparatus as specified in claim 13 plus;

gas pressure means operably connected to said upper platen for exerting gas pressure on the solid upper surface of the meltable material in a drum for serving as a total, or subsidiary, source of pressure for unloading said drum.

* * * * *